April 19, 1966   A. H. HALFF ETAL   3,246,504
DIRECT DETERMINATION OF DENSITY OF SOLIDS
Filed March 19, 1962
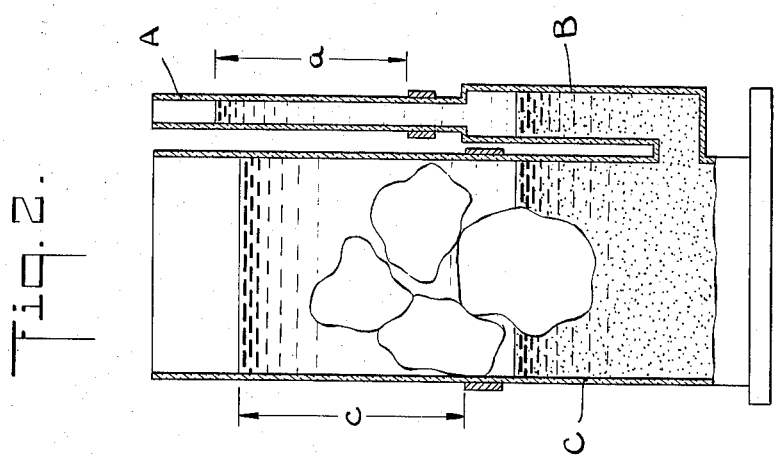
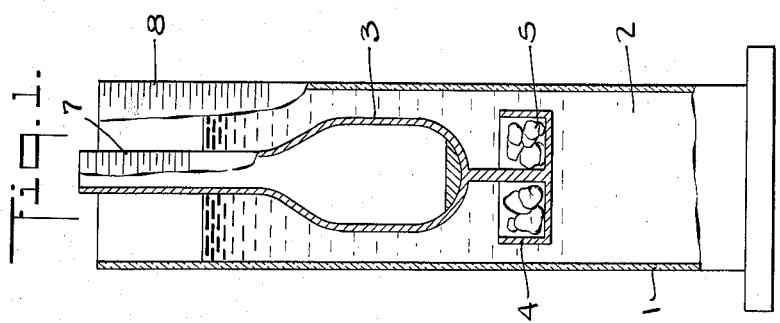
INVENTORS
ALBERT H. HALFF
ALLEN F. REID
BY
Frank A. Bowers
ATTORNEY

United States Patent Office 3,246,504
Patented Apr. 19, 1966

3,246,504
DIRECT DETERMINATION OF DENSITY OF SOLIDS
Albert H. Halff, 4591 Rheims Place, and Allen F. Reid, 3145 Spur Trail, both of Dallas, Tex.
Filed Mar. 19, 1962, Ser. No. 180,509
3 Claims. (Cl. 73—32)

This invention relates to the measurement of the density of solids compatible with immersion of the solid in a liquid or liquids.

When a solid is immersed in a liquid, it displaces a volume of liquid equal to that of the immersed solid and a floating solid displaces a weight of liquid equal to the weight of the solid. By combination of these two effects to simultaneously measure the weight and volume of a solid there is provided a direct measurement of its average density by a portable unit in one rapid operation.

In the accompanying drawings

FIG. 1 is a vertical sectional view of a glass cylinder container showing the specimen of solid material in suspension submerged in a liquid and with corresponding readings of calibrations on the cylinder and on a float carrying the material; and FIG. 2 is a similar vertical sectional view of a cylinder with an attached side arm and having both a light and a heavy liquid carrying the solid material and provided with comparable calibrations on the cylinder and side arm.

In the accompanying drawings a solid material is shown in different immersions in a liquid or between relatively light and heavy liquids combined to give resultant readings on scales determining the average density of the immersed material.

In the system shown in FIG. 1 there is a transparent cylinder 1 containing liquid 2 in which floats float 3 containing ballast 6 and suspending basket 4 immersed in the liquid 2.

Calibration 7 on the float 3 along its upper narrow extension shows the successive displacements of the float in the liquid before and after addition of the solid material 5 (of unknown density which, in the instance shown, is greater than the density of the liquid 2) placed in the basket 4.

Liquid levels are read on calibration 7 on the float and on calibration 8 on the cylinder 1. Depending on the weight of material 5, the float 3 will displace more or less liquid 2 with corresponding shift of the calibration 7 at the liquid surface level which itself will shift with up or down indication on calibration 8.

For average density of the solid material 5 equal to that of the liquid 2, the reading of the level on calibration 7 will be substantially the same before and after the addition of the solid in the basket. The liquid level on calibration 8 will rise with the increase in volume and the float will rise with it.

With material 5 denser than liquid 2 the float will sink to provide additional displacement of liquid 2 and a precisely compensating increase in buoyancy required by the float 3 to carry the extra weight of the solid. This in turn will raise the surface level of liquid 2 on calibration 8.

In order to change the density range of operation either 2 may be changed to a liquid of a different density or the ballast 6 (which might be a liquid or a calibrated weight) may be changed in weight. The usefulness of this invention is not limited to the measurement of solids with densities more than the liquid used. If the density is to be determined of a solid weighing less than the displaced liquid in this illustration, it is only necessary to enclose the solid in a perforated basket which weighs enough so that the combined weight of the basket and the solid is greater than the weight of the liquid displaced.

As mentioned above, when a solid is immersed in a liquid it displaces a volume of liquid equal to its volume. A solid floating between two liquids, one heavier and one lighter than the solid, displaces the weight of heavy liquid equal to its weight corrected for buoyancy of the solid in the lighter liquid. Thus, if a solid is placed in a cylinder containing two liquids, one with a density greater than and one with a density less than that of the solid, the total liquid level will be increased by an amount equivalent to the volume of the solid immersed, and the level of the denser liquid will be raised by an amount equivalent to the corrected weight of the solid.

A broad range of densities may be measured by using water for the lighter liquid and mercury for the denser liquid. However, the increase in level of the heavy liquid in the cylinder is small when many common solids are immersed.

An apparatus which amplifies the weight indication so that it may be read with greater precision is shown in FIG. 2. The apparatus consists of a large cylinder with a small attached side arm. The side arm has a reduced diameter in its upper section into which the lighter liquid only is allowed to raise. All cylinders have uniform cross sections.

To make a density determination, the solid is introduced into the large cylinder. Its volume is measured by the increases in the two liquid levels. The increase in weight in the large cylinder from the added solid is balanced by an increase in liquid head in the smaller cylinder. The displacement of the heavier liquid level in the larger lower section of the side arm is amplified by a much greater displacement of the level of the lighter liquid in the top section of the side arm. Clips are shown designating the levels of the liquids before introduction of the solid.

In FIG. 2, A, B and C represent the cross-sectional areas of the top side arm, the bottom side arm and the main cylinder, respectively; and $a$ and $c$ represent the increases in liquid levels in the side arm and the main cylinder, respectively. The volume V of the solid is $$V = aA + cC$$

The increased pressure in the large cylinder is equal to the weight of the solid per unit cross section of the large cylinder less the pressure from the heavy liquid pushed into the side arm. If the densities of the lighter and heavier liquids are represented by $d$ and $D$ respectively, and if the ratios of the cylinder diameters are defined as $R \equiv A/B$ and $r \equiv A/C$, then the weight W of the solid is $$W = aC[D(r+R) + d(1-R)]$$

and the density of the solid is $$\rho = \frac{W}{V} = \frac{D(r+R) + d(1-R)}{r + \frac{c}{a}}$$

With any apparatus and pair of fluids, $\rho$ is a function of only $c/a$, the ratio of liquid-level changes. The calculation may be easily made from the formula; or the density may be read on a simple nomograph constructed with the level changes on parallel axes and the density on the diagonal axis. The introduced solid may be in several pieces, and it need not be uniform in density. The determination furnishes the mean density of all the material introduced.

After the measurement is made, the liquids may be poured into a container through a sieve that will retain the solids. The liquids may then be reintroduced into the apparatus and used for another measurement. The appropriate amount of each fluid may be empirically determined so that both may be rapidly poured from a single container kept for that purpose into the larger cylinder, the lighter liquid first. Standard solids may be introduced to check for density changes of the liquids from dissolved substances. A convenient apparatus utilized in our laboratories has cylinder diameters of 2, 6, and 16 mm., respectively, and uses 8 ml. of mercury. On this apparatus density determinations were made on samples of stainless steel, aluminum, plastic-coated lead, and a heterogeneous group of 70 small pebbles with an average weight of 235 mg., each. The same samples were weighed and their volumes were determined by visual estimation of water displacement in a 25 ml. graduated cylinder. All samples had volumes of from 4 to 8 ml. The results are shown in Table I below. A major cause of the differences between the results obtained by the two techniques may well be nonuniformity of bore in the lower portion of the side arm which was made from stock Pyrex tubing.

TABLE I

[Density determination with special apparatus compared to the same determinations from conventional weight-liquid displacement measurements. Values are the averages of six determinations; the standard deviation (S.D.) is that of an individual measurement]

| Sample | Special Apparatus | | Conventional Measurement | |
|---|---|---|---|---|
| | Density (g./ml.) | S.D. (g./ml.) | Density (g./ml.) | S.D. (g./ml.) |
| Stainless steel | 8.05 | ±0.10 | 7.82 | ±0.07 |
| Aluminum | 2.802 | ±.058 | 2.771 | ±.047 |
| Plastic-coated lead | 10.88 | ±.39 | 11.22 | ±.15 |
| 70 small stones simultaneously | 2.651 | ±.056 | 2.702 | ±.026 |

The method here described does not increase the accuracy of density measurements, but in many instances it is more convenient than conventional methods. The apparatus needs little, if any, adjustment. Its operation is speedy and simple and its ease of transportation makes it especially useful in this field.

We claim:

1. Apparatus for measuring the average density of a solid material comprising the combination of a main container having different density liquids variable to different levels for receiving an article buoyant therein and an auxiliary side arm connected only to the main container below the surface of the heavier liquid and extending above the level of lighter liquid in the main container, said auxiliary arm having a portion with a reduced cross-sectional area commencing above the level of the heavier liquid and having a lighter liquid in said arm above the level of the heavier liquid completely separate from the lighter liquid in the main container to amplify the variations of the level of the heavier liquid, and means on said main container and said reduced portion providing an indication of said levels corresponding to the volume and to the weight of an article in the main container for determination of the average density of the article.

2. Apparatus as set forth in claim 1 wherein there is only one heavier liquid and only one lighter liquid.

3. Apparatus as set forth in claim 1 wherein the lighter liquid in the main container is the same as the lighter liquid in the auxiliary side arm.

References Cited by the Examiner

UNITED STATES PATENTS

| 959,633 | 5/1910 | Sommer | 73—450 |
| 2,506,973 | 5/1950 | Segal | 73—450 |
| 2,889,703 | 6/1959 | Lipson et al. | 73—32 |

RICHARD C. QUEISSER, Primary Examiner.

JOSEPH P. STRIZAK, DAVID SCHONBERG,
Examiners.